United States Patent
Larsson et al.

(10) Patent No.: US 9,816,164 B2
(45) Date of Patent: Nov. 14, 2017

(54) POWDER, POWDER COMPOSITION, METHOD FOR USE THEREOF AND USE OF THE POWDER AND POWDER COMPOSITION

(71) Applicants: HÖGANÄS AB (PUBL), Höganäs (SE); VLAAMSE INSTELLING VOOR TECHNOLOGISCH ONDERZOEK N.V., Mol (BE)

(72) Inventors: Per-Olof Larsson, Helsingborg (SE); Sigurd Berg, Stranbaden (SE); Hilmar Vidarsson, Munka Ljungby (SE); Leen Bastiaens, Westerlo (BE); Milica Limirovic, Mol (BE)

(73) Assignee: HÖGANÄS AB (PUBL), Höganäs (SE)

( * ) Notice: Subject to any disclaimer, the term of this patent is extended or adjusted under 35 U.S.C. 154(b) by 281 days.

(21) Appl. No.: 14/429,688

(22) PCT Filed: Sep. 18, 2013

(86) PCT No.: PCT/EP2013/069326
§ 371 (c)(1),
(2) Date: Mar. 19, 2015

(87) PCT Pub. No.: WO2014/044692
PCT Pub. Date: Mar. 27, 2014

(65) Prior Publication Data
US 2015/0232967 A1 Aug. 20, 2015

(30) Foreign Application Priority Data

Sep. 21, 2012 (EP) .................................. 12185424
Jul. 23, 2013 (EP) .................................. 13177597

(51) Int. Cl.
| | | |
|---|---|---|
| C22C 38/00 | (2006.01) | |
| B09C 1/00 | (2006.01) | |
| C02F 1/70 | (2006.01) | |
| B09C 1/08 | (2006.01) | |
| C02F 101/36 | (2006.01) | |
| C02F 103/06 | (2006.01) | |

(52) U.S. Cl.
CPC ............ C22C 38/002 (2013.01); B09C 1/002 (2013.01); B09C 1/08 (2013.01); C02F 1/705 (2013.01); C02F 2101/36 (2013.01); C02F 2103/06 (2013.01); Y10T 428/12 (2015.01)

(58) Field of Classification Search
CPC ......... C22C 38/002; B09C 1/002; B09C 1/08; C02F 1/705; C02F 2101/36; C02F 2103/06; Y10T 428/12
See application file for complete search history.

(56) References Cited

U.S. PATENT DOCUMENTS

| | | | |
|---|---|---|---|
| 4,837,109 A | * | 6/1989 | Tokunaga .............. H01F 1/0573 148/302 |
| 7,635,236 B2 | | 12/2009 | Zhao et al. |
| 2009/0191084 A1 | | 7/2009 | Liskowitz et al. |
| 2010/0126944 A1 | | 5/2010 | Braida et al. |
| 2011/0130575 A1 | | 6/2011 | Li et al. |

FOREIGN PATENT DOCUMENTS

| | | |
|---|---|---|
| CN | 102409243 | 11/2011 |
| CN | 102 409 243 A | 4/2012 |
| EP | 0 506 684 A1 | 10/1992 |
| JP | 2000080401 A | 3/2000 |
| JP | 2005-131570 A | 5/2005 |
| KR | 1076765 B1 | 3/2009 |
| WO | WO 2004/007379 A1 | 1/2004 |

OTHER PUBLICATIONS

Machine Translation of JP2000-080401A, dated Mar. 2000.*
JP200513170A Toyo Ink MFG Co LTD "Soil Purification Agent for Purifying Underground Water, Comprises Iron Powder and/or Brown Iron Oxide Particles, Present Amount of Hexavalent Chromium, Mercury, Cadmium, Lead, Arsenic, Fluorine and Boron" English translation (11 pages) (May 6, 2005).
JP200513170A Machine Assisted Translation (May 6, 2005) copyright 2013 Thomson Reuters 28 pages.
ASM Handbook: vol. 7: Powder Metal Technologies and Applications, p. 56-70 "Milling" Sep. 1, 1998, American Society for Metals, Metals Park, Ohio 44073.
ASM Handbook: vol. 7: Powder Metal Technologies and Applications, p. 25-30 "Atomization" Sep. 1, 1998, American Society for Metals, Metals Park, Ohio 44073.
International Search Report (PCT/ISA/210) dated Nov. 14, 2013, by the European Patent Office as the International Searching Authority for International Application No. PCT/EP2013/069326.
Written Opinion (PCT/ISA/237) dated Nov. 14, 2013, by the European Patent Office as the International Searching Authority for International Application No. PCT/EP2013/069326.

* cited by examiner

*Primary Examiner* — Anthony J Zimmer
(74) *Attorney, Agent, or Firm* — Buchanan Ingersoll & Rooney P.C.

(57) ABSTRACT

An iron-boron alloy powder or an iron-boron alloy powder composition suitable for remediation of halogenated hydrocarbon polluted soil, water or groundwater as well as the use of the powder or powder composition. The boron-iron alloy powder suitable for remediation of polluted soil or waters may have 0.1-40% by weight of boron and inevitable impurities up to a content of 10% by weight. Further, a method for remediation of halogenated hydrocarbon polluted soil, water or groundwater.

23 Claims, No Drawings ance of pollutants should preferably
POWDER, POWDER COMPOSITION, METHOD FOR USE THEREOF AND USE OF THE POWDER AND POWDER COMPOSITION The work leading to this invention has received funding from the European Community's Seventh Framework Programme (FP7/2007-2013) under grant agreement no 226565.

FIELD OF THE INVENTION

The present invention relates to a new material and the use of the new material for remediation of polluted soil, water or groundwater as well as a method for remediation of polluted soil, water or ground water.

BACKGROUND

The modern industrial era has provided mankind with numerous of chemical substances improving life conditions and overall health situation. It is however also well-known and recognized that in the ever ending search for more cost effective substances and processes, the long term effect on environmental conditions arising from uncontrolled use of these substances and processes has for a long period of time been, and sometimes still are, neglected.

The use of halogenated hydrocarbons (for instance chlorinated compounds) in a variety of applications has created health and environmental problems as these substances often are very stable and tend to accumulate in living bodies.

In industrial sites or other places where the handling of such substances has been poor from environmental and health hazard aspects, halogenated hydrocarbons have been accumulated in the soil and ground water and can constitute a long term threat against health and environment. It is therefore of outmost importance to find methods and materials suitable for reducing the content of halogenated hydrocarbons in polluted soil, water and ground water. As these pollutants may be contained in large volumes of e.g. soils at various concentration levels, materials to be used for decomposing and reducing contents of pollutants should preferably be fairly inexpensive and have an ability to be effective at various concentration levels and varying overall conditions.

Remediation technologies are many and varied but can be categorized into ex-situ and in-situ methods. Ex-situ methods involve excavation of effected soils and subsequent treatment at the surface. In-situ methods seek to treat the contamination without removing the soils. The more traditional remediation approaches (used almost exclusively on contaminated sites from the 1970s to the 1990s) consists primarily of soil excavation and disposal to landfill ("dig and dump") and groundwater ("pump and treat"). In situ technologies include solidification and stabilization and have been used extensively in the USA.

One interesting in-situ remediation technology for treating halogenated/chlorinated hydrocarbon contaminated soil, water or ground water is based on decomposition of the substances into less harmful species of which one end product being chloride-ions.

Iron in elemental form, so called zero-valent iron (ZVI), has been proposed by many inventors and scientists for decomposing halogenated hydrocarbons in soil and water. ZVI alone and in combination with various elements and substances have been described in this context as well as methods for the use thereof. As iron is a fairly inexpensive material, has high redox capability and low health and environmental impact, iron is a most suitable agent for this purpose.

Patent application WO2004/007379 describes support catalysts for in situ remediation of soil and/or groundwater contaminated with chlorinated hydrocarbons, comprising activated carbon as an absorbent and impregnated with ZVI. Examples of suitable shape of ZVI are powder, turnings or chips. Among others, the application also discloses support catalysts made by pyrolizing a mixture of activated carbon and iron salt followed by reducing the formed iron oxide to ZVI.

In U.S. Pat. No. 7,635,236 to Zhao, a method is disclosed for preparing highly stabilized and dispersible ZVI nanoparticles and using the nanoparticles in a remediation technology against inorganic chemical toxins in contaminated sites. The patented method comprises: providing a composition of ZVI nanoparticles dispersed in an aqueous carrier and stabilizer comprising carboxymethyl cellulose and delivering said composition to the contaminated site.

US patent application 2009/0191084 (Liskowitz) teaches ZVI in the form of particles or iron wool enriched with graphite carbon and sulphur which is supposed to create catalytic sites on the surface of the ZVI, promoting atomic hydrogen formation in a aqueous oxygen containing environment polluted with e.g. trichloroethylene. The formed atomic hydrogen will promote reduction of trichloroethylene to ethylene and ethane. Pure ZVI on the other hand tends to promote a reaction chain involving direct electron transfer from the corroding iron to the dissolved contaminating compound. In the case of trichloroethylene this compound will thus decompose into 1,2 cis-dichloroethylene and further into vinylchloride which is regarded as more harmful than the original compound. Atomized ZVI with a content of at least 4% graphite carbon and 0.5% sulphur is recommended.

US patent application 2010/0126944 discloses degradation of organic nitro compounds, especially nitro aromatic compounds and nitroamines, with bimetallic particles comprising ZVI having discontinuous coatings of metallic copper on the surface thereof. Higher rates of degradation are achieved when the water has a pH of 3.5-4.4 and especially when acetic acid is present in the water.

Patent application US 2011/0130575 describes a clay comprising a 2:1 aluminosilicate having negative charged sites; the 2:1 aluminosilicate clay containing sub-nano-sized ZVI particles distributed on the clay surface. Methods of synthesizing the novel clay is also described as well as its use in remediation applications e.g. dechlorination reductions.

Korean patent KR1076765B1 discloses nitrate reduction of water using ZVI combined with nickel, palladium or copper.

EP patent EP0506684 to Gilham discloses a procedure for cleaning a halogenated organic contaminant from groundwater in an aquifer by contacting the polluted ground water with a metal body, e.g. ZVI in the form of filings, particulates, fibers etc. under anaerobic conditions.

Many of the disclosed ZVI containing materials used for remediation of halogenated hydrocarbon polluted soil or waters include nano-sized ZVI particles of which the production is very costly while the function of others is based on a synergetic effect between ZVI and a costly metal. Thus there is a need for an efficient and cost effective ZVI based material for remediation, and especially for in-situ remediation, of halogenated hydrocarbon polluted soil, water or ground water.

SUMMARY

The present invention relates to an iron-boron alloy powder or an iron-boron alloy powder composition suitable for remediation of halogenated hydrocarbon polluted soil, water or groundwater as well as the use of the powder or powder composition. Further, the present invention provides a method for remediation of halogenated hydrocarbon polluted soil, water or groundwater. It has been shown that the new material has a similar or higher activity for decomposition of halogenated hydrocarbon compared to commercially available much finer zero valent iron powders.

DETAILED DESCRIPTION

The present invention provides a solution to the above mentioned problems and is based on the unexpected finding that ZVI particles, alloyed with boron (B), exhibit a surprisingly high efficiency in terms of decomposing halogenated/chlorinated hydrocarbon polluted water and soil. It has also been shown that ZVI, alloyed with B, having a relatively coarse particle size, well above so called nano-sized scale, have the same or higher efficiency for decomposing halogenated/chlorinated hydrocarbon polluted water and soil compared to finer ZVI and/or nano-scale ZVI.

Furthermore, the materials according to the invention exhibit a relatively long life-time making them suitable for remediation purposes, especially remediation of polluted soil/groundwater. In a first aspect of the present invention it is provided a B-iron alloy powder (also denominated as B-ZVI alloy powder) having a B-content of 0.1-40% by weight, preferably 0.1-30% by weight, preferably 0.1-20% by weight, preferably 0.1-10% by weight, preferably 0.1-5% by weight or preferably 0.3-4% by weight. Other intervals of boron contents according to the first aspect of the present invention are 0.5-15% by weight, 0.5-10% by weight, 0.5-7% by weight, 0.5-5% by weight, 0.5-4% by weight, 0.7-4% by weight, 0.7-3.5% by weight or 0.8-3% by weight. A content of B above 40% by weight does not contribute to improved properties in terms of reaction efficiency and will also considerably increase the cost of the material. B-content below 0.1% by weight will not render the alloy powder the desired properties. In this context, B-content above 20% by weight, or above 10%, or even above 7% by weight may increase the risk that excessive amounts of B are released to the recipient, thus constituent a potential environmental problem. The optimal B-content is depending of e.g. type and concentration of chemicals (for instance chlorinated hydrocarbons) to be decomposed and type of polluted soil, water or groundwater.

Preferably, the B-ZVI alloy powder has a content of Fe of more than 60% iron, preferably more than 80% by weight, preferably more than 85%, preferably more than 90% by weight, preferably more than 93% by weight, preferably more than 95% by weight, preferably more than 96% by weight, preferably more than 96.5% by weight.

The amount of inevitable impurities such as carbon, oxygen, sulphur, manganese and phosphorus should be less than 10%, preferably less than 7%, preferably less than 5% by weight, preferably less than 3% by weight.

Carbon and sulphur may in some embodiments contribute to the remediation and thus the contents of these elements can be controlled to desired levels. Such levels may be up to 5% by weight.

In addition other elements such as copper, silver, gold, platinum and palladium may be intentionally added.

The particle size may be in the interval of 20 mm and 1 µm. The optimal particle size range is depending of e.g. type and concentration of halogenated hydrocarbons to be decomposed and type of polluted soil or groundwater.

In one embodiment the B-ZVI alloy powder particles according to the present invention may have a particle size between 20 mm and 0.5 mm, preferably between 10 mm and 1 mm. Alternatively or in addition to this embodiment the particle size may be defined by the weight average particle size, $X_{50}$, as measured by standard sieving according to SS EN 24497 or by laser diffraction according to SS-ISO 13320-1, being between 8 and 3 mm.

In another embodiment a particle size between 0.5 mm and 10 µm, preferably 250 µm and 10 µm may be used. Alternatively or in addition to this embodiment the particle size may be defined by the weight average particle size, $X_{50}$, as measured by standard sieving according to SS EN 24497 or by laser diffraction according to SS-ISO 13320-1, being between 150 µm and 20 µm. In a further embodiment, a particle size between 50 µm to 1 µm, preferably 30 µm to 1 µm may be used. Alternatively or in addition to this embodiment the particle size may be defined by the weight average particle size, $X_{50}$, as measured according to SS-ISO 13320-1, by laser diffractometry, being between 20 µm and 5 µm.

It may for certain applications be interesting to use coarser particle sizes which may be produced from finer particles and turned into coarser porous or non-porous particles, thereby forming aggregate(s), by known methods such as agglomeration, compaction and milling, heat treatment and milling, or compaction, heat treatment and milling. Examples of such known methods may be found in Metals Handbook, Ninth Edition, Volume 7, Powder Metallurgy, American Society for Metals, 1984, page 293-492, Consolidation of Metal Powders. Depending on the application, i.e. type of soil or fluid to be treated and type of contaminants, various mixes of B-ZVI alloy powder with known substances may be chosen in order to obtain optimal efficiency, forming a ZVI-B-alloy powder composition (also denominated as B-iron alloy powder composition or B-ZVI alloy powder composition). The particle size being determined by standard sieving according to SS EN 24497 or by laser diffraction according to SS-ISO 13320-1. The particle size intervals shall be interpreted as 80% or more, by weight of the particles being within the intervals.

The B-ZVI alloy powder used may originate directly from atomization a molten-iron-boron alloy, e.g. from gas atomization or water atomization as described in Metals Handbook, Ninth Edition, Volume 7, Powder Metallurgy, American Society for Metals, 1984, page 25-30, Atomization. Alternatively the B-ZVI alloy powder may be produced through milling of an atomized iron-boron alloy or through milling solidified pieces of various size of an iron-boron alloy melt. Examples of milling operations are described in Metals Handbook, Ninth Edition, Volume 7, Powder Metallurgy, American Society for Metals, 1984, page 56-70, Milling of Brittle and Ductile Materials. In another embodiment of the first aspect of the present invention the B-ZVI alloy powder particles are dispersed in a carrier or thickener such as guar gum or carboxymethyl cellulose thus avoiding sedimentation of the particles and facilitating handling of the material, e.g. facilitating injection of a water dispersion containing B-ZVI alloy powder into polluted soil or aquifer. In one embodiment the thickener is guar gum solution at a concentration 0.1-10% by weight, preferably 0.1-6% by weight, in which the B-ZVI alloy powder composition is dispersed. It has also been shown that the presence of boron increases the viscosity of a guar gum based dispersion compared to a dispersion with similar material but without boron. This enables additions of lower amount of guar gum, thus decreasing the cost.

In a second aspect of the present invention there is provided a method for remediation of polluted soil, water or groundwater. Pollution may be due to the presence of hydrocarbons (e.g. halogenated hydrocarbons such as e.g. chlorinated or boronated compounds, dyes, etc.), other organics, or metals. The method comprising the steps of providing a B-ZVI alloy powder or B-ZVI alloy powder composition according to the first aspect, contacting the B-ZVI alloy powder or B-ZVI alloy powder composition with the polluted soil water or groundwater by placing the B-ZVI alloy powder or B-ZVI alloy powder composition in a trench or in an aquifer in the polluted area, alternatively injecting the B-ZVI alloy powder or B-ZVI alloy powder composition into the polluted soil or aquifer, for a time sufficient to decompose the pollutants. In one embodiment of the method according to the present invention, the B-ZVI alloy powder or B-ZVI alloy powder composition will be allowed to remain in the soil or aquifer after the decomposition reactions have diminished or ceased. The B-ZVI alloy powder or B-ZVI alloy powder composition according to the invention may also be applied in material reactor type recipients, above ground or below ground level. The B-ZVI alloy powder or B-ZVI alloy powder composition according to the invention may also be applied in soilmixing.

positions according to the invention. All materials were characterized with respect to particle size distribution, chemical analysis and specific surface area. Particle size distributions X10, X50 and X90 were measured according to SS-ISO 13320-1 by laser diffractometry with a HELOS laser diffraction sensor together with RODOS dispersing unit diffraction. The units X10, X50 and X90 represent the particles sizes—a percentage (10%, 50%, 90%) of the particles of the material is smaller than the indicated size. The focal lengths were R3 and R5. The trigger thresholds for start/stop conditions were 2%, respectively. The light scattering model was according to Fraunhofer. Dry dispersion was used, with an injection diameter of 4 mm, primary pressure was 3 bar. The dispersion unit was set up to reach an optical concentration between 5 to 15%.

The specific surface areas were analyzed by single point measurement with a Micromeritics Flowsorb III instrument according to the BET method (Brunauer-Emmett-Teller method) using adsorption of $N_2$ at the temperature of liquid $N_2$. All the samples were degassed at 110° C. for 30 minutes before analysis.

Chemical analysis was performed using standard analytical methods. The following Table1 shows characteristics of the materials used. Materials 1 to 3 are reference materials against which the compositions of the invention were benchmarked.

TABLE 1 characteristics of materials used;

| No | Product name (supplyer) | X10 [μm] | X50 [μm] | X90 [μm] | BET [m2/kg] | B [%] | C [%] | O [%] | S [%] | N [%] |
|---|---|---|---|---|---|---|---|---|---|---|
| 1 | RNIP-10DS nano-iron (TODA Kogyo Corp.) |  | 0.07* |  | 4970* |  | NA | NA | NA | NA |
| 2 | HQ (BASF) | 0.6 | 1.2 | 2.4 | 818 |  | 0.75 | 0.44 | 0.00 | 0.75 |
| 3 | Atomized iron powder (Höganäs) | 22 | 41 | 62 | 94 |  | 0.00 | 0.09 | 0.01 | 0.00 |
| 4 | Fe0.8B (Höganäs) | 20 | 58 | 103 | 76 | 0.8 | 0.02 | 1.1 | 0.01 | 0.01 |
|   | Fe1.5B | 18 | 55 | 105 | 700 | 1.43 | 0.04 | 0.68 | 0.00 | 0.01 |
| 5 | Fe3B (Höganäs) | 2 | 30 | 59 | 515 | 3 | 0.28 | 1.86 | 0.00 | 0.00 |
| 6 | Fe18B (Höganäs) | 1 | 5 | 12 | 1098 | 18 | 0.01 | 0.71 | 0.00 | 0.00 |

*data from supplier;
NA: not available

In a third aspect of the present invention there is provided the use of the B-ZVI alloy powder or B-ZVI alloy powder composition for remediation of soil or (ground)water polluted with halogenated hydrocarbons such as Chlorinated Aliphatic Hydrocarbon (CAH Other non-limiting examples of pollutants may be chlorinated ethenes comprising tetrachloroethylene (PCE), trichloroethylene (TCE) and cis-dichloroethylene (cDCE); the group of chloroethanes comprising 1,1,1,2 tetrachloroethane (1111 TeCE), 1,1,2,2 tetrachloroethenes (1122 TeCE), 1,1,1 trichloroethane (111-TCA), 1,1,2 trichloroethane and 1,1 Dichloroethane (11-DCA); the group of chloromethanes comprising chloroform, dichlorobromomethane; and the group of chlorinated propanes comprising 1,2,3-trichloropropane.

EXAMPLES

The following examples illustrate the various aspects and embodiments of the present invention but shall not be interpreted as restricting the invention thereto.

Various iron materials known in the art were chosen as reference materials and compared to the powders and compositions according to the invention.

Example 1—Reactivity Tests

The following examples show the capacity for degradation of some CAHs for the various materials according to Table 1. CAHs used were tetrachloroethylene (PCE), trichloroethylene (TCE), cis-dichloroethylene (cDCE) and 1,1,1 trichloroethane (111-TCA).

All batch tests were prepared in 160 ml glass vials with butyl/PFTE grey septum containing 100 ml of anaerobic simulated groundwater and 60 ml of headspace, 5 g ZVI was added for samples 2 to 6 and 0.5 g for the nano-scale ZVI sample 1. Lower concentrations of nano-scale particles were selected due to their high reactivity. The simulated groundwater was spiked with approximately 5 mg/l of PCE, 5 mg/l of TCE, 5 mg/l of c-DCE and 5 mg/l of 111-TCA. The experiments were set up under anaerobic conditions and in triplicates. The vials were then placed for continuously gently mixing at 12° C. $H_2$, CAHs, acetylene, ethane and methane were measured as start up (only blank) and after 14, 28, 49, and 105 days. CAH concentrations (including breakdown products) were measured using a GC-FID instrument (VARIAN).

Hydrogen production at each sampling time was analyzed using a GC-TCD instrument (Interscinece). At each sampling time the redox potential and pH were measured using a redox/pH meter (Radiometer).

The concentrations of PCE, TCE and c-DCE with respect to time are shown in Tables 2 to 4. Tables 5 and 6 show concentrations with respect to time of the breakdown products ethene and ethane.

TABLE 2

Concentration of PCE [µg/l]

| No | | \multicolumn{5}{c}{DAYS} | | | | |
|---|---|---|---|---|---|---|
| | | 0 | 14 | 25 | 49 | 105 |
| | | \multicolumn{5}{c}{Concentration µg/l PCE} | | | | |
| 1 | RNIP-10DS nano-iron | 5000 | 2100 | 1400 | 1000 | 200 |
| 2 | HQ | 4000 | 300 | 50 | 0 | 0 |
| 3 | Atomized iron powder | 3600 | 1700 | 1000 | 500 | 0 |
| 4 | Fe0.8B | 5300 | 1000 | 100 | 0 | 0 |
| 5 | Fe1.5B | 3700 | 1500 | 500 | 50 | 0 |
| 6 | Fe3B | 4600 | 1700 | 600 | 50 | 0 |
| 7 | Fe18B | 4600 | 1000 | 0 | 0 | 0 |

TABLE 3

Concentration of TCE [µg/l]

| No | | \multicolumn{5}{c}{Days} | | | | |
|---|---|---|---|---|---|---|
| | | 0 | 14 | 25 | 49 | 105 |
| | | \multicolumn{5}{c}{Concentration µg/l TCE} | | | | |
| 1 | RNIP-10DS nano-iron | 5100 | 1600 | 700 | 400 | 100 |
| 2 | HQ | 4000 | 1500 | 400 | 0 | 0 |
| 3 | Atomized iron powder | 5100 | 1800 | 400 | 200 | 100 |
| 4 | Fe0.8B | 5500 | 100 | 0 | 0 | 0 |
| 5 | Fe1.5B | 4300 | 400 | 20 | 0 | 0 |
| 6 | Fe3B | 4800 | 0 | 0 | 0 | 0 |
| 7 | Fe18B | 4800 | 0 | 0 | 0 | 0 |

TABLE 4

Concentration of c-DCE [µg/l]

| No | | \multicolumn{5}{c}{Days} | | | | |
|---|---|---|---|---|---|---|
| | | 0 | 14 | 25 | 49 | 105 |
| | | \multicolumn{5}{c}{Concentration c-DCE [µg/l]} | | | | |
| 1 | RNIP-10S nano-iron | 5800 | 4800 | 4600 | 4400 | 3800 |
| 2 | HQ | 4000 | 2100 | 1300 | 900 | 500 |
| 3 | Atomized iron powder | 5700 | 5500 | 4900 | 3900 | 200 |
| 4 | Fe0.8B | 5600 | 200 | 0 | 0 | 0 |
| 5 | Fe1.5B | 5000 | 700 | 0 | 0 | 0 |
| 6 | Fe3B | 4800 | 0 | 0 | 0 | 0 |
| 7 | Fe18B | 4800 | 0 | 0 | 0 | 0 |

TABLE 5

Concentration of ethene [µg/l]

| No | | 0 | 14 | 25 | 49 | 105 |
|---|---|---|---|---|---|---|
| | | \multicolumn{5}{c}{Concentration ethene [µg/l]} | | | | |
| 1 | RNIP-10DS nano-iron | 100 | 400 | 800 | 1000 | 1200 |
| 2 | HQ | 0 | 500 | 600 | 700 | 500 |
| 3 | Atomized iron powder | 0 | 300 | 600 | 800 | 700 |
| 4 | Fe0.8B | 0 | 1300 | 800 | 400 | 100 |
| 5 | Fe1.5B | 0 | 1200 | 900 | 500 | 50 |
| 6 | Fe3B | 0 | 1000 | 500 | 200 | 0 |
| 7 | Fe18B | 0 | 50 | 0 | 0 | 0 |

TABLE 6

Concentration of ethane [µg/l]

| No | | 0 | 14 | 25 | 49 | 105 |
|---|---|---|---|---|---|---|
| | | \multicolumn{5}{c}{Concentration ethane [µg/l]} | | | | |
| 1 | RNIP-10DS nano-iron | 50 | 300 | 400 | 500 | 400 |
| 2 | HQ | 0 | 400 | 600 | 700 | 500 |
| 3 | Atomized iron powder | 0 | 500 | 600 | 800 | 1000 |
| 4 | Fe0.8B | 0 | 1000 | 1300 | 1800 | 2000 |
| 5 | Fe1.5B | 0 | 750 | 1000 | 1800 | 1900 |
| 6 | Fe3B | 0 | 1100 | 1700 | 2300 | 2600 |
| 7 | Fe18B | 0 | 2700 | 2900 | 2900 | 3000 |

As can be seen from the Tables 2 to 4 above, the boron containing materials according to the invention nos. 4 to 7, show a superior reactivity rate for reducing the contaminants TCE and c-DCE compared to the reference materials nos 1 to 3. The commercially available material no 2 (HQ, Carbonyl Iron Powder; BASF) shows a comparable reactivity rate related to decomposition of the contaminant PCE, when compared to the materials according to the invention. Tables 5 and 6 above show the concentration of the less harmful reaction products of the decomposition reactions, ethene and ethane. It can be noticed that the concentrations of ethene and ethane increase more rapidly for the materials according to the invention compared to the reference materials.

Example 2—Corrosion Rates

During the decomposition of the pollutants according to Example 1 the various ZVI materials were partially consumed, but also the anaerobic water reacted with the ZVI materials was producing hydrogen. Thus a corrosion rate could be calculated for each ZVI material through measurement of the produced hydrogen. The following Table 7 shows the corrosion rate and life time for some of the ZVI materials in Example 1.

TABLE 7

Corrosion rates [mol/(gs)] and Life time [years]

| No | | Corrosion rate [mol/(gs)] | Life time [years] |
|---|---|---|---|
| 1 | RNIP-10DS nano-iron | $3.50 \times 10^{-10}$ | 1.62 |

TABLE 7-continued

Corrosion rates [mol/(gs)] and Life time [years]

| No | | Corrosion rate [mol/(gs)] | Life time [years] |
|---|---|---|---|
| 2 | HQ | $3.32*10^{-11}$ | 17.1 |
| 3 | Atomized iron powder | $2.1*10^{-11}$ | 26.3 |
| 4 | Fe0.8B | $6.01*10^{-11}$ | 9.44 |
| 5 | Fe1.5B | $3.32*10^{-11}$ | 17.1 |
| 6 | Fe3B | $3.78*10^{-11}$ | 15.0 |
| 7 | Fe18B | $3.22*10^{-11}$ | 17.6 |

As can be seen from Table 7 above, the materials according to the invention show life times in the same order as known microscale ZVI and considerably longer than the nano ZVI material 1.

Example 3

Dechlorination rates of a number pollutants in the presence of the ZVI were calculated using the pseudo-first order rate equation; $C=C_0*e^{-kt}$, whereas C is the concentration at any time, $C_0$ is the initial concentration, k is the first order decay constant [day-1] and t is the reaction time [days]. Half-lives were calculated as $t\frac{1}{2}=\ln 2/k$ [days]

TABLE 8

Half-lives [days] for contaminants PCE, TCE, c-DCE and 1,1,1 TCA

| No | | PCE $t\frac{1}{2}$ [days] | TCE $t\frac{1}{2}$ [days] | c-DCE $t\frac{1}{2}$ [days] | 1,1,1 TCA $t\frac{1}{2}$ [days] |
|---|---|---|---|---|---|
| 1 | RNIP-10DS nano-iron | 4.1 | 3.0 | 33 | 1.9 |
| 2 | HQ | 10.0 | 8.64 | 29.6 | 1.17 |
| 3 | Atomized iron powder | 16.7 | 16.0 | 24.9 | 4.68 |
| 4 | Fe0.8B | 5.25 | 2.41 | 2.43 | 1.15 |
|   | Fe1.5B | 10.0 | 3.81 | 1.52 | 0.75 |
| 5 | Fe3B | 8.00 | 1.15 | 1.15 | 1.17 |
| 6 | Fe18B | 6.0 | 1.15 | 1.15 | 1.17 |

The above table 8 shows that over-all half-lives for the pollutants PCE, TCE, c-DCE and 1,1,1 TCA treated with the material according to the invention, nos. 4 to 6, are considerably lower compared to pollutants treated with the comparative microscale materials, nos. 2 and 3. Only for PCE the known nanoscale iron (no. 1) shows better results.

The invention claimed is:

1. A method for remediation of polluted soil, groundwater or aquifer comprising the steps of;
providing a boron-iron alloy powder comprising 0.7-40% by weight of boron and inevitable impurities up to a content of 10% by weight,
contacting the boron-iron alloy powder with the polluted soil, water or groundwater,
incubating the mixture of boron-iron alloy powder with the polluted soil, water or groundwater to decompose the pollutants.

2. The method according to claim 1, wherein the boron-iron alloy powder remains in the soil or aquifer after the decomposition reactions have ceased.

3. The method according to claim 1, wherein the pollutants are hydrocarbons comprising halogenated and brominated hydrocarbons, other organics or metals.

4. The method according to claim 3, wherein the pollutants are selected from the group consisting of:
the group of chlorinated ethenes comprising tetrachloroethylene (PCE), trichloroethylene (TCE) and, cis-dichloroethylene (cDCE);
the group of chloroethanes comprising 1,1,1,2 tetrachloroethane (1111 TeCE), 1,1,2,2 tetrachloroethenes (1122 TeCE), and 1,1,1 trichloroethane (111-TCA), 1,1,2 trichloroethane and 1,1 Dichloroethane (11-DCA);
the group of chloromethanes comprising chloroform, dichlorobromomethane-; and
the group of chlorinated propanes comprising 1,2,3-trichloropropane.

5. The method according to claim 1, wherein the boron-iron alloy powder consists of 0.7-40% by weight of boron and inevitable impurities up to a content of 10% by weight.

6. The method according to claim 1, wherein the boron-iron alloy powder has an iron content of more than 80% by weight.

7. The method according to claim 1, wherein the boron-iron alloy powder has a boron content of 0.7-4% by weight.

8. The method according to claim 1, wherein the boron-iron alloy powder comprises particles having a particle size range between 10 mm and 1 mm.

9. The method according to claim 1, wherein the boron-iron alloy powder comprises particles having a particle size range between 250 µm and 10 µm.

10. A method for remediation of polluted soil, groundwater or aquifer comprising the steps of:
providing a boron-iron alloy powder composition containing a boron-iron alloy powder comprising 0.7-40% by weight of boron and inevitable impurities up to a content of 10% by weight,
contacting the boron-iron alloy powder composition with the polluted soil, water or groundwater,
incubating the mixture of boron-iron alloy powder composition with the polluted soil, water or groundwater to decompose the pollutants.

11. The method according to claim 1, wherein the boron-iron alloy powder has a boron content between 2% and 40% by weight.

12. The method according to claim 5, wherein the boron-iron alloy powder has a boron content between 0.7 and 40% by weight and an iron content between 60% and 75% by weight.

13. The method according to claim 1, wherein the boron-iron alloy powder has an inevitable impurities content of less that 3% by weight.

14. The method according to claim 1, wherein the inevitable impurities comprise copper and sulfur, and the boron-iron alloy powder has a content of copper and sulfur between 0.5% and 5% by weight.

15. The method according to claim 5, wherein the boron-iron alloy powder has an inevitable impurities content of less that 3% by weight.

16. The method according to claim 1, wherein the boron-iron alloy powder has an iron content of more than 60% by weight.

17. The method according to claim 1, wherein the boron-iron alloy powder has a boron content of 0.7-30% by weight.

18. The method according to claim 1, wherein the boron-iron alloy powder comprises particles having a particle size range between 20 mm and 0.5 mm.

19. The method according to claim 1, wherein the boron-iron alloy powder comprises particles having a particle size range between 0.5 mm and 10 µm.

20. The method according to claim 1, wherein the boron-iron alloy powder comprises particles having a particle size range between 50 μm to 1 μm.

21. The method according to claim 18, wherein the boron-iron alloy powder comprises aggregated particles.

22. The method according to claim 18, wherein the boron-iron alloy powder is produced from a gas atomized or water atomized molten iron-boron alloy.

23. The method according to claim 18, wherein the boron-iron alloy powder is produced from grinded or milled solidified pieces of various size of an iron-boron alloy melt.

* * * * *

UNITED STATES PATENT AND TRADEMARK OFFICE
CERTIFICATE OF CORRECTION

PATENT NO. : 9,816,164 B2
APPLICATION NO. : 14/429688
DATED : November 14, 2017
INVENTOR(S) : Per-Olof Larsson et al.

It is certified that error appears in the above-identified patent and that said Letters Patent is hereby corrected as shown below:

On the Title Page

Item (71) Applicants, please remove:
VLAAMSE INSTELLING VOOR TECHNOLOGISCH ONDERZOEK N.V.

Signed and Sealed this
First Day of May, 2018

Andrei Iancu
*Director of the United States Patent and Trademark Office*